United States Patent [19]
Seseña et al.

[11] Patent Number: 6,056,633
[45] Date of Patent: May 2, 2000

[54] APPARATUS FOR CENTERING AND BLOCKING AN OPHTHALMIC LENS DISC

[75] Inventors: Santiago Albert Seseña, Teia; Francisco Civit Rico; Carlos Moreno Rubio, both of Barcelona, all of Spain

[73] Assignee: Indo Internacional S.A., Barcelona, Spain

[21] Appl. No.: 09/045,798

[22] Filed: Mar. 23, 1998

[30] Foreign Application Priority Data

May 6, 1997 [ES] Spain ..................... 9700965

[51] Int. Cl.⁷ ........................ B24B 41/06
[52] U.S. Cl. ............... 451/384; 451/390; 451/5
[58] Field of Search ................ 451/384, 390, 451/460, 5, 6, 42

[56] References Cited

U.S. PATENT DOCUMENTS

| | | | |
|---|---|---|---|
| 4,737,918 | 4/1988 | Langlois et al. | 364/474 |
| 5,257,198 | 10/1993 | Van Schoyck | 364/474.02 |
| 5,498,200 | 3/1996 | Werner | 451/460 |
| 5,720,647 | 2/1998 | Gottschald | 451/5 |
| 5,721,644 | 2/1998 | Murray et al. | 359/819 |
| 5,919,080 | 7/1999 | Savoie et al. | 451/5 |
| 6,011,630 | 1/2000 | Shanbaum et al. | 356/401 |

FOREIGN PATENT DOCUMENTS

| | | |
|---|---|---|
| 0206860 | 12/1986 | European Pat. Off. . |
| 3829488 A1 | 3/1990 | Germany . |
| 2024679 | 7/1989 | Spain . |
| 2014801 | 7/1990 | Spain . |
| 2047299 | 1/1991 | Spain . |

*Primary Examiner*—Timothy V. Eley
*Assistant Examiner*—Dung Van Nguyen
*Attorney, Agent, or Firm*—Sughrue, Mion, Zinn, Macpeak & Seas, PLLC

[57] ABSTRACT

The apparatus has: a rocking support and an upper clamping member for blocking the lens disc; a first transparent screen provided with reference lines; an image pick-up which obtains images of the lines and images of the disc; an optical system located between the means and the pick-up; an electronic circuitry for processing the images and the modifications in the reference lines caused by inserting the disc between the lines and the pick-up, building a synthetic image; a digital reader for frame forms, in communication with the circuitry; and a second screen for displaying a synthetic image superimposed on the frame data.

13 Claims, 4 Drawing Sheets

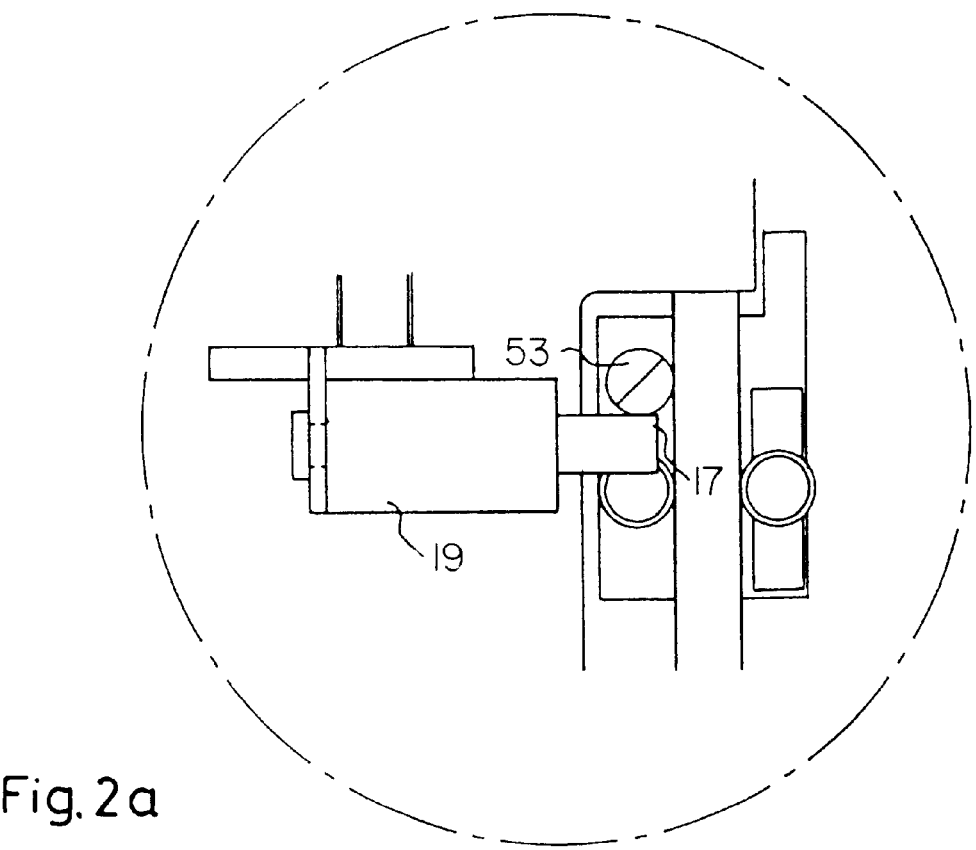
Fig. 2a
Fig. 3
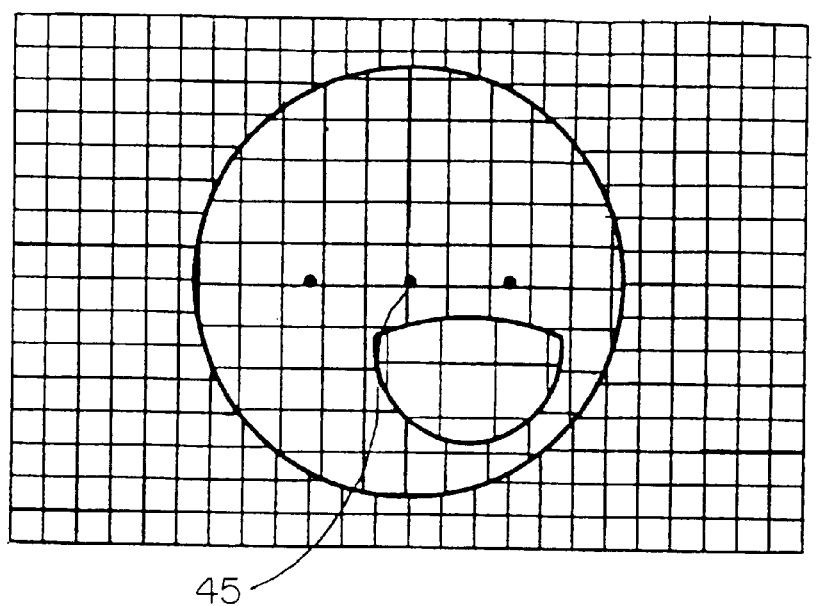

APPARATUS FOR CENTERING AND BLOCKING AN OPHTHALMIC LENS DISC

DESCRIPTION

1. Field of the Invention

This invention relates to an apparatus for centering and blocking an ophthalmic lens disc, said disc having a front face and a rear face, the apparatus being of the type having [a] lens disc clamping means, formed by a rocking support adapted to be a rest for said rear face and a vertically moveable upper clamping member adapted retentively to engage said front face; and [b] a first screen allowing light to pass therethrough and which is related with reference lines, displayable through said lens disc. This apparatus is used prior to performing a beveling operation on said ophthalmic lens.

2. Prior Art

As is known, the basic purpose of the centering and blocking apparatus is to position a lens disc, by means of an observation system, relative to a centering reference based on the geometry of the spectacle frame and on the optical parameters of assembly, so that, once the disc has been centered, it may be blocked with a blocking adapter or holding member which will allow the subsequent beveling operation to be performed.

The centering process may further include the operation of comparing the shape of a spectacle frame rim with the lens disc so as to be able to determine whether the diameter of said lens disc is sufficiently large to allow the subsequent beveling thereof, without shortage of material at any point on the contour thereof.

The systems allowing these operations have been based, traditionally, on the projection of the lens disc contour on a diffuser screen. This projection is superimposed on the spectacle frame rim shape, taken from a physical model or from a graphic representation on a monitor, display screen or the like, by optical means (sets of mirrors, etc.) or simply mechanical means (direct overlaying).

These systems introduce greater or smaller parallax errors, due to the spacing between the position of the lens disc and the projection screen. This leads to projections of a size other than the true one and displacements of the contour and centering points. Furthermore, there are notable variations of visibility associated with the degree of light absorptive capacity of the lens disc, depending on the treatment, coloring, etc. thereof, which oblige an adjustment of the light (visible or infra red) source allowing the projection.

Other systems are based on direct observation of the lens disc, without projection. Here again, the overlaying with the shape of the spectacle frame rim, taken from a physical model or a graphic representation on a monitor, display screen or the like, is made by optical means (sets or mirrors or others) or simply mechanical means.

In these systems, the parallax error is induced by the positional differences of the lens, being closer to or further removed from the observer, due to the graduation, thickness and associated prism thereof. Furthermore, if the model is placed behind the lens, there is an additional error due to the modifications introduced by the refractive power thereof. All of this induces, here again, images of a size other than the true one and displacements of the centering points, although they may be minimized if the observer situates himself optically distant from the object to be observed, in this case the lens. In these systems there are, likewise, notable variations of visibility associated with the degree of light absorptive capacity of the lens disc, depending on the treatment, coloring, etc. thereof, which oblige an adjustment of the light (visible or infra red) source allowing the projection. An additional disadvantage is the worse viewability of the addition segments of multifocal lenses, which are easily observable in projection systems.

In all cases, the operator's intervention is required for the centering operation. The operator has to position the lens, either by manual or by mechanical methods, relative to a centering reference, which involves a certain degree of skill and knowledge.

The documents DE 40 12 661 A1, DE 38 29 488 A1, FR 91 15717, ES 8902510, EP 86401062.4 and DE G88 09 365.4 all disclose different solutions of centering and blocking apparatus as described above.

SUMMARY OF THE INVENTION

It is an object of the invention to overcome the aforementioned drawbacks. This object is achieved with an apparatus of the type first mentioned above, said apparatus comprising: [i] an electronic image pick-up, suitable for obtaining images of said reference lines through said lens disc and images of the lens disc itself; [ii] a telecentric type optical system, situated between said clamping means and said electronic image pick-up; [iii] electronic circuitry appropriate for digitizing and processing said images and for analyzing the modifications undergone by said reference lines due to the insertion of said lens disc between the lines and the image pick-up, constructing a synthetic image of said lens disc; [iv] a digital reader of the frame shape; [v] a communications bus between said digital reader and said circuitry, for transfer of data of said frame; and [vi] a second screen, appropriate for displaying, in graphic form, said synthetic image superimposed on said frame data.

BRIEF DESCRIPTION OF THE DRAWING

Further advantages and features of the invention will be appreciated from the following description, wherein without any limiting nature there is disclosed a preferred embodiment of the invention, with reference to the accompanying drawings, in which:

FIG. 2a is a view, on a larger scale, of the electromagnet and the shaft in the proximity of the sloping surface of the end of the upper clamping member.

FIGS. 3, 4, 5 and 6 are show different examples of synthetic images of the lens disc as they appear on the second screen.

DETAILED DESCRIPTION OF THE INVENTION

Figure 1:
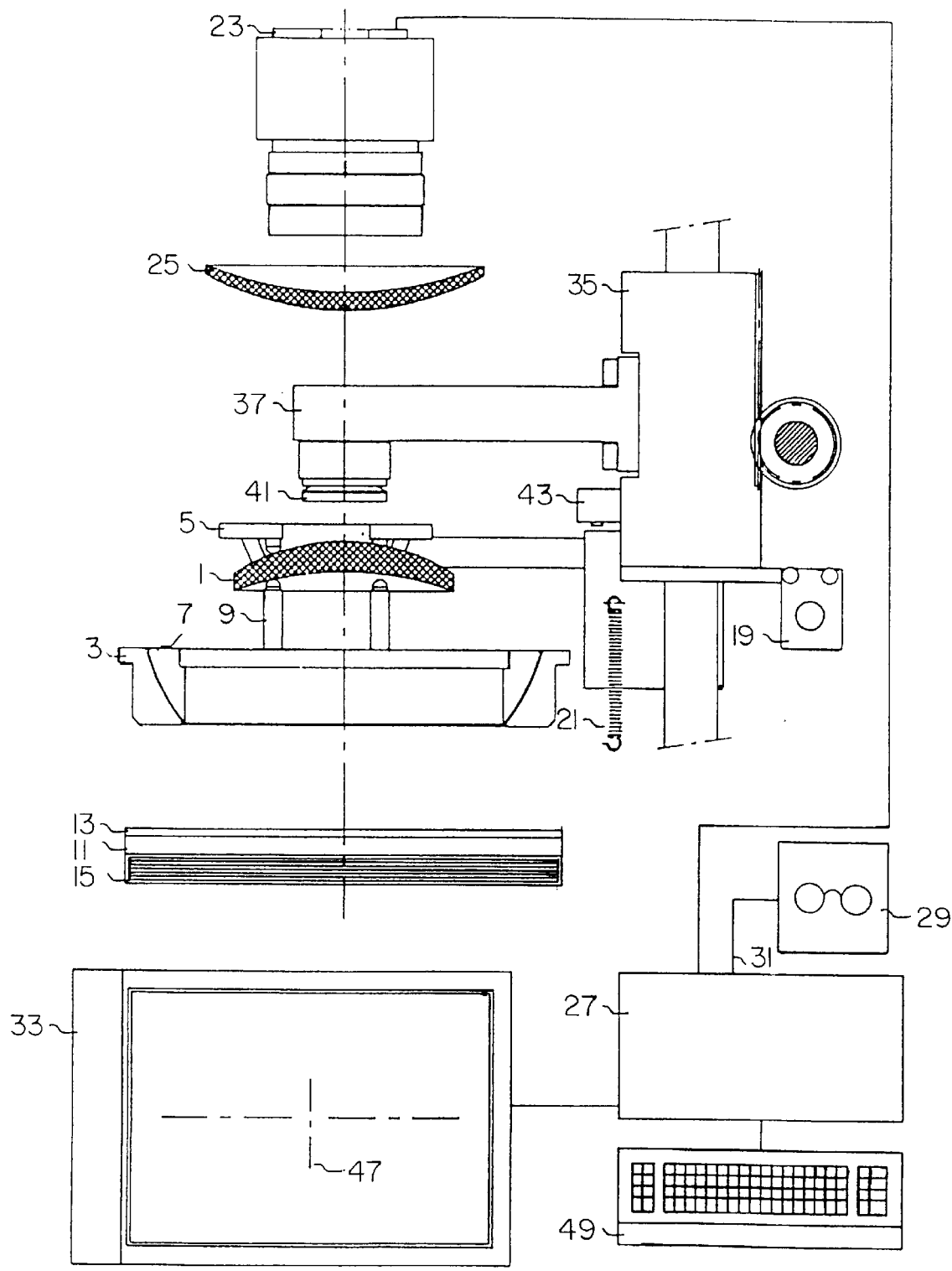
FIG. 1 is a schematic view of the invention, including the main parts.

The apparatus allows the appropriate data of an ophthalmic lens disc 1 to be obtained, as described hereinafter. The lens disc 1 is one of the types typically used in the practice of ophthalmic optics, being spherical, aspherical, toric, prismatic or multifocal, the latter being of the type having either one or more addition segments (as to be seen in FIG. 3) or progressive.

The lens disc 1 is placed in clamping means, generally comprising a support member 3 and an upper clamping member 5.

The support member 3 is formed preferably by a lower rocking basket 7 from which there extend three pins 9 arranged on the corners of a right triangular prism. The rear face of the lens disc 1 rests on the heads of these pins. The support member 3 allows a first transparent or translucid screen 11 to be seen, which screen is associated with reference lines, preferably a cross web 13, preferably of a grid square type, i.e. a set of squares formed by the intersection at rightangles of two bundles of equidistant parallel straight lines. The invention also includes, nevertheless, the case where said reference lines comprise concentric circles or other equivalent combinations. A light source 15 illuminates the first screen 11 and provides a uniform light, preferably of the type of an electroluminiscent or fluorescent panel, although other light sources (with or without filter) may be used, provided that the aforementioned uniformity is achieved.

Figure 2:
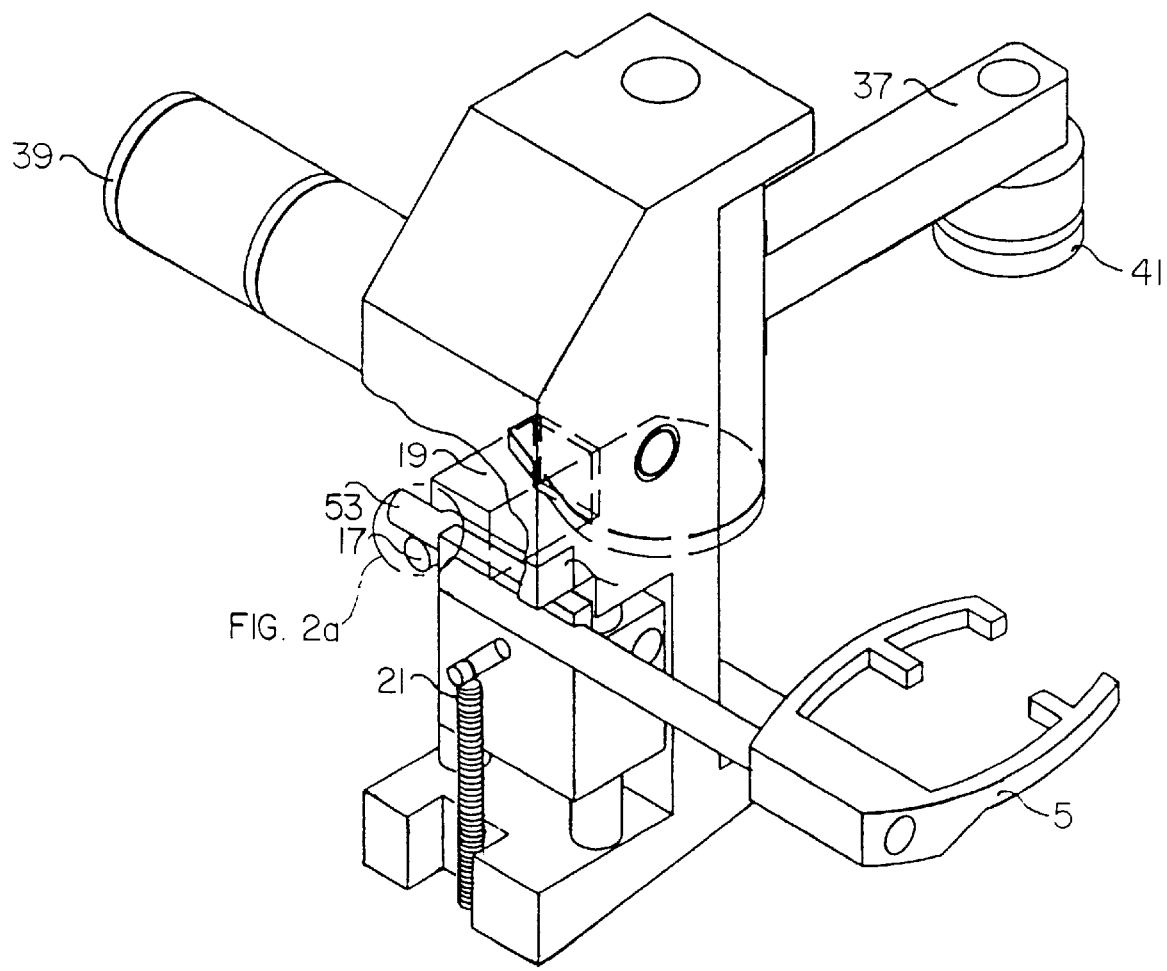
FIG. 2 is a perspective view of the clamping means for the lens disc.

The upper clamping member 5 is vertically moveable between a raised position and a lowered position in which it presses against the lens disc 1. In the raised position, it is held separated from the rocking basket 7 by a stem 17 (FIG. 2) of an electromagnet 19. In the lowered position, the pins 9 of the basket 7 and the clamping member 5 hold the lens disc 1 in a fixed position in which the support plane of the front face of the lens disc 1, being tangential to the front face, is orientated perpendicularly to the direction of movement of the clamping member 5, which optimizes the fixing operation of the blocking adapter 41 (FIG. 2) for beveling operations. A spring 21 urges the clamping member to the lowered position in tight engagement with the lens disc 1. Further mention will be made hereinafter of the upper clamping member 5.

The apparatus of the invention comprises an electronic image pick-up 23 which is preferably of the CCD ("Charge Coupled Device") type, with the abbreviation CCD being commonly used in this field of the art. The pick-up 23 allows the images to which further reference will be made hereinafter to be obtained.

Between the pick-up 23 and the clamping means 3 and 5 there is an optical system 25 of the telecentric type formed by one or more lenses and with which the possible errors of parallax are eliminated. This optical system comprises at least one lens with one of the faces thereof being of aspherical shape. As is known, an aspherical surface is different from a spherical one and is useful for reducing aberrations The pick-up 23, through the optical system 25, obtains images of the ophthalmic lens disc 1 and also of the said reference lines 13. In view of the above mentioned features of the optical system 25, the image of the ophthalmic lens disc 1 observed from the image pick-up 23 is always the same size, irrespective of the closeness to or distance from the optical system 25 and any parallax effect is eliminated.

The apparatus also comprises electronic circuitry 27 for image processing and apparatus control. The electronic circuitry 27 is provided with means for digitizing and processing the image from the image pick-up 23 (forming a synthetic image) and for analyzing the modifications of the cross web or grid 13 which are observed due to the effect of inserting the lens disc 1 between the cross web or grid 13 and the image pick-up 23, which allows the size of said lens disc 1 and the position and dimensions of multifocal segments, centering marks and other details to be known. A spectacle frame form digital reader 29 is in communication with the circuitry 27 over a communications bus 31.

Another item of the apparatus is a second screen 33, which may be liquid crystal (LCD) or a monitor screen, which may show, as a graph, the synthetic image formed by the circuitry 27 from the data and the image picked up by the image pick-up 23. This image comprises all the data required for centering and blocking and overlays at the same time on this synthesized image a graphic representation of the form of the spectacle frame rim being processed.

In a known way, the apparatus is provided with blocking means 35 formed by an arm 37 mechanically associated with a drive system 39 (FIG. 2) and which operate in the plane perpendicular to the lens disc 1. Such means 35 contains a fixed housing for a blocking adapter 41 which, as is known, has to engage the lens disc 1 for the subsequent beveling operation.

The process for centering and blocking is described hereinafter, together with the operation of a preferred embodiment.

The lens disc 1 is situated on the rocking basket 7, in such a way as to rest on the pins 9.

The upper clamping member 5 is driven upwards (FIG. 2) until it operates a micro switch or optical switch type sensor 43. This operation releases the electromagnet 19 allowing the upper clamping member 5 to be lowered to engage the front face of the lens disc 1. The upper clamping member 5 urged by the spring 21 presses against the lens disc 1, causing a reorientation of the rocking basket 7 to adapt itself to the plane of the rear part of the lens disc 1, generally not parallel to that of the front face. In this way, it is achieved that the support plane of the front face of the disc is always in one same plane.

Here, the second screen 33 displays a synthesized image of the lens disc 1 with the centering marks 45 thereof (FIG. 3), i.e., dots applied to the lens disc 1 to indicate where the optical center is and, if any, which is the axis of astigmatism. Since this is known from the prior art, further details thereof are omitted.

The synthesized image is obtained from the processing, by the electronic circuitry 27, of the information from the image pick-up 23 which visualizes the cross web or grid 13, which is modified or deformed as a result of the insertion of the lens disc 1, through the telecentric type optical system 25. The result of said insertion, with an Example of FIG. 3 is an image of the external contour of the lens disc 1, of the centering marks 45 thereof and of the cross web or grid 13, the latter with lines which are fragmented in the lens disc 1 contour and, in the multifocal lenses with addition segment (FIG. 3), in the region of the latter, the fragmentation being easily recognizable by digital analysis. This image of the cross web 13 is further deformed depending on the geometry of the lens disc 1, the identification of the type thereof, i.e. positive, negative, multifocal, progressive, etc., being possible. The electronic circuitry 27 digitizes the image and processes the data allowing all the contours, the centering marks and the type of lens disc 1 to be recognized, synthesizing an image which is displayed on the second screen 33 and which basically contains the contours and the centering marks 45 in the absolute position thereof. By this processing, any modification of the position of the lens disc 1 is detected by the electronic circuitry and up-dated on the second screen 33. For a correct display of the above, it is important that the light source 15 should meet satisfy the above mentioned conditions.

With the lens 1 already held by the clamping member, slight movements are made to bring the centering marks 45 close to a reference 47 appearing superimposed on the second screen 33, but without it being necessary to make these marks coincide exactly with the reference 47. As mentioned above, the electronic circuitry 27 updates the position of the lens disc 1 on the second screen 33. Once the said lens disc I has been placed in position, the circuitry 27 recognizes the absolute position of the centering marks 45 thereof and their orientation or axis, as well as the position thereof relative to the reference 47, by way of analysis of the digitized image. This reference must be previously calibrated or adjusted, by construction of the apparatus, so that it coincides with the position of the center of the blocking adapter 41 situated at the end of the blocking arm 37 when the latter descends on the lens disc 1.

On initiation of the process or, preferably, after recognition of the position of the lens disc 1 on the second screen 33, the electronic circuitry 27 superimposes on the synthetic image of the lens the digitized contour of the spectacle frame rim which will have been previously obtained by way of the digital reader 29 and transferred to the electronic circuitry 27 over the communications bus 31. The digitized contour is located automatically on the second screen depending on the centering marks of the lens disc 1 and on the specific centering data which are function of the patient and which may have been previously entered by means of an auxiliary keyboard 49. The location of the said digitized contour may be modified by hand, if necessary, through said auxiliary keyboard 49. This process allows it to be checked whether the size of the lens disc 1 is sufficient to reproduce the shape of the spectacle frame rim, the contour of which has been digitized.

The blocking operation is activated through the auxiliary keyboard 49. The blocking arm 37 driven by the motor 39 (FIG. 2) is lowered on the lens and fixes the blocking adapter 41 on the lens disc 1. The electromagnet 19 is lowered together with the arm 37 and moves beyond the rear end of the upper clamping member 5 by sliding of the stem 17 thereof along the sloping plane 53 of the end of the upper clamping member 5. Thereafter, the blocking arm 37 is raised and returned to the rest position. During the raising, the rear end of the upper clamping member 5 is pushed by the stem 17 and is raised therewith and with the blocking arm 37, such that the lens disc 1 is freed to allow the operator to remove it easily.

Figure 4:
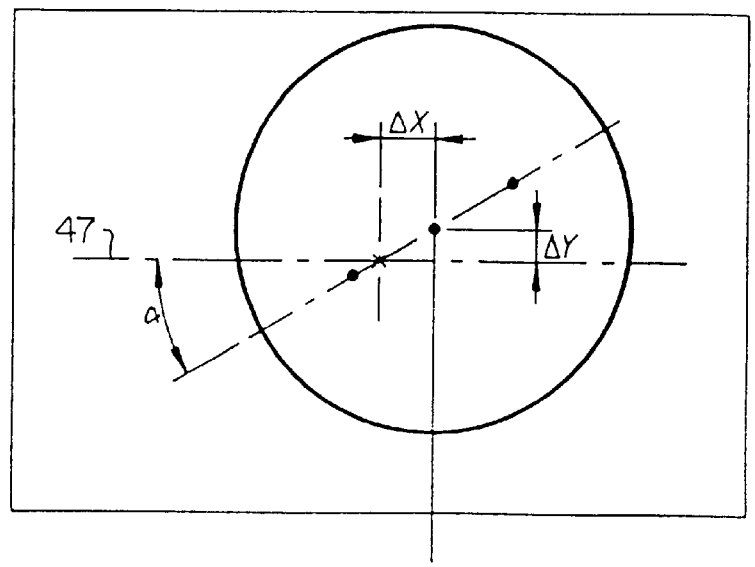

After the blocking operation, the electronic circuitry 27 recomputes the shape of the digitized contour of the frame rim, by rotating and moving the center thereof, depending on the differences, in position (Δ X and ΔY in FIG. 4 and axis (α in the same Figure), between the centering marks 45 of the lens disc 1 and the reference 47 appearing on the second screen 33. In the recomputation it is also necessary to consider the interpupillary distance and the height of the assembly it is wanted to bevel, previously entered in the apparatus, for example, via the keyboard 49. This recomputation is important, since operator, as stated hereinbefore, has only to move the centering marks close to the reference 47, without having to look for an exact alignment, which leads to greater simplicity of operation and the elimination of the human error. The thus recomputed shape is ready to be processed in a numerical control beveling machine, being sent typically over a digital communications bus.

Figure 5:
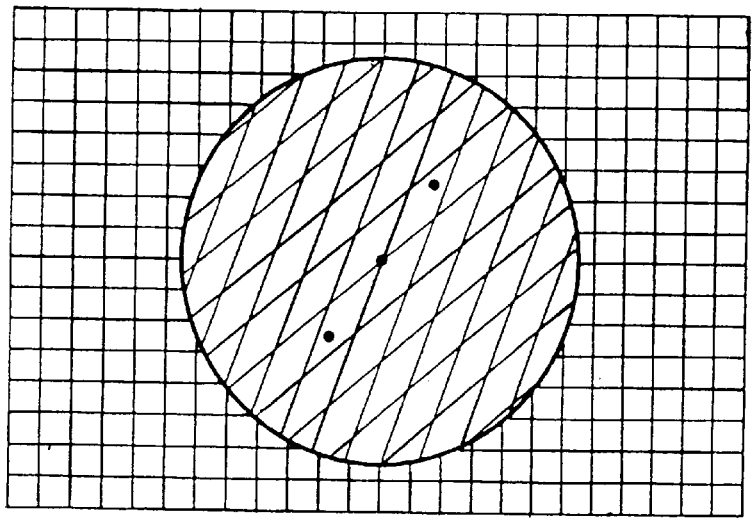

The CCD image pick-up 23 displays a cross web or grid 13 undergoing deformation and fracture on insertion the lens disc 1. The deformation is directly linked to the technical features of the lens, particularly its dioptric strength, whereby by analyzing the deformation of the cross web 13, it is possible to know some of these features. To be precise, it is possible to recognize the orientation of the axis of a toric shaped lens disc, since this produces a deformation of the cross web 13 which, in the case of a squared grid, converts into a diamond or rectangular shape, with two orthogonal axes of symmetry, which may be determined by image processing, through the electronic circuitry 27. This feature allows the axis determined by the centering marks 45 to be compared with the true axis of the lens disc 1, highlighting possible marking errors. FIG. 5 shows a graphic example of what has been said above.

Figure 6:
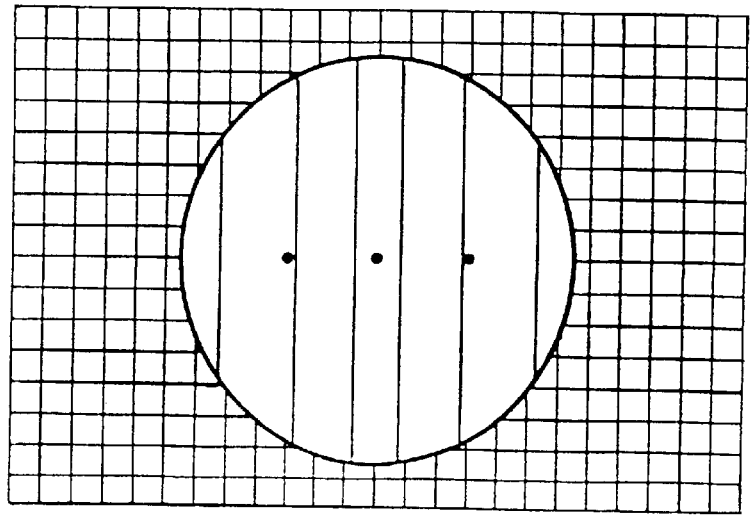

It is also possible to approach, provided that there non null dioptric strength, the situation of the optical center of a toric shaped or spherical lens, by mathematical analysis of the deviation of the cross web lines 13 relative to their situation without the lens disc. FIG. 6 is an example thereof.

What we claim is:

1. An apparatus for centering and blocking an ophthalmic lens disc, said disc having a front face and a rear face, the apparatus being of the type having [a] lens disc clamping means, formed by a rocking support adapted to be a rest for said rear face and a vertically moveable upper clamping member adapted retentively to engage said front face; and [b] a first screen allowing light to pass therethrough and which is related with reference lines, displayable through said lens disc, said apparatus comprising: [i] an electronic image pick-up, suitable for obtaining images of said reference lines through said lens disc and images of the lens disc itself; [ii] a telecentric type optical system, situated between said clamping means and said electronic image pick-up; [iii] electronic circuitry appropriate for digitizing and processing said images and for analyzing modifications undergone by said reference lines due to the insertion of said lens disc between the lines and the image pick-up, constructing a synthetic image of said lens disc; [iv] a digital reader of the shape of a frame; [v] a communications bus between said digital reader and said circuitry, for transfer of data of said frame; and [vi] a second screen, appropriate for displaying, in graphic form, said synthetic image superimposed on said frame data.

2. The apparatus of claim 1, wherein said electronic image pick-up is of the Charge Coupled Device (CCD) type.

3. The apparatus of claim 1 or 2, wherein said optical system comprises at least one lens have an aspherical form on one surface.

4. The apparatus of claim 1, wherein substantially parallel three pins extend from said rocking support, on the heads of which said rear surface of said lens disc rests.

5. The apparatus of claim 1, wherein said reference lines consists of a cross web incorporated in said first screen.

6. The apparatus of claim 5, wherein said cross web is of the squared grid type.

7. The apparatus of claim 5, wherein said cross web comprises a series of concentric circles.

8. The apparatus of claim 1, being provided with a uniform light source over which said first screen is situated.

9. The apparatus of claim 8, wherein said uniform light source is of the electroluminescent panel type or fluorescent type with diffuser.

10. The apparatus of claim 1, wherein a reference mark appears located in the center of said second screen.

11. The apparatus of claim 1, wherein said second screen is a liquid crystal screen or a monitor.

12. The apparatus of claim 1, wherein the vertical movement of said upper clamping member occurs between a raised position in which it is held by an electromagnet and a lowered position in which it presses against said lens disc, there being provided a spring urging said upper clamping member to said lowered position.

13. The apparatus of claim 1, and being provided with a vertically moveable blocking arm carrying a blocking adapter suitable for attachment to said lens disc.

* * * * *